US007415601B2

United States Patent
May et al.

(10) Patent No.: US 7,415,601 B2
(45) Date of Patent: Aug. 19, 2008

(54) METHOD AND APPARATUS FOR ELIMINATION OF PROLOG AND EPILOG INSTRUCTIONS IN A VECTOR PROCESSOR USING DATA VALIDITY TAGS AND SINK COUNTERS

(75) Inventors: Philip E. May, Palatine, IL (US); Raymond B. Essick, IV, Glen Ellyn, IL (US); Brian G. Lucas, Barrington, IL (US); Kent D. Moat, Winfield, IL (US); James M. Norris, Naperville, IL (US)

(73) Assignee: Motorola, Inc., Schaumburg, IL (US)

( * ) Notice: Subject to any disclaimer, the term of this patent is extended or adjusted under 35 U.S.C. 154(b) by 889 days.

(21) Appl. No.: 10/652,135

(22) Filed: Aug. 29, 2003

(65) Prior Publication Data

US 2004/0128473 A1    Jul. 1, 2004

Related U.S. Application Data

(63) Continuation-in-part of application No. 10/184,772, filed on Jun. 28, 2002, now Pat. No. 7,140,019, and a continuation-in-part of application No. 10/184,583, filed on Jun. 28, 2002, now Pat. No. 7,159,099.

(51) Int. Cl.
    *G06F 9/30*  (2006.01)
(52) U.S. Cl. .................. 712/233; 712/218; 712/226; 711/152
(58) Field of Classification Search ................. 712/233, 712/216–218, 226; 711/152
    See application file for complete search history.

(56) References Cited

U.S. PATENT DOCUMENTS 3,718,912 A    2/1973    Hasbrouck et al.

(Continued)

OTHER PUBLICATIONS

Hennessy and Patterson, Computer Architecture A Quantative Approach, 1996, Morgan Kaufman Publishers, Inc., Second Edition, pp. 239-247.*

(Continued)

*Primary Examiner*—Tonia L. M. Dollinger

(57) ABSTRACT

A method and apparatus for the elimination of prolog and epilog instructions in a vector processor. To eliminate the prolog, a functional unit of the vector processor has at least one input for receiving an input data value tagged with a data validity tag and an output for outputting an intermediate result tagged with a data validity tag. The data validity tags indicate the validity of the data. Before a loop is executed, the data validity tags are set to indicate that the associated data values are invalid. During execution of the loop body a functional unit checks the validity of input data. If all of the input data values are valid the functional operation is performed, the corresponding data validity tag set to indicate that the result is valid. If any of the input data values is invalid, the data validity tag of the result is set to indicate that the result is invalid. To eliminate the epilog, an iteration counter is associated with each sink unit of the vector processor. When a specified number of data values have been produced by a particular sink, no more data values are produced by that sink. The instructions for the pipelined loop body may be repeated, without alteration, to eliminate prolog and epilog instructions.

17 Claims, 9 Drawing Sheets

U.S. PATENT DOCUMENTS

| | | | |
|---|---|---|---|
| 4,128,880 | A | 12/1978 | Cray, Jr. |
| 4,744,043 | A | 5/1988 | Kloker |
| 4,760,545 | A | 7/1988 | Inagami et al. |
| 4,807,183 | A | 2/1989 | Kung et al. |
| 4,825,361 | A | 4/1989 | Omoda et al. |
| 4,918,600 | A | 4/1990 | Harper et al. |
| 5,021,945 | A | 6/1991 | Morrison et al. |
| 5,206,822 | A | 4/1993 | Taylor |
| 5,317,734 | A | 5/1994 | Gupta |
| 5,367,494 | A | 11/1994 | Shebanow et al. |
| 5,390,352 | A | 2/1995 | Kinoshita |
| 5,418,953 | A | 5/1995 | Hunt et al. |
| 5,423,040 | A | 6/1995 | Epstein et al. |
| 5,450,607 | A | 9/1995 | Kowalczyk et al. |
| 5,495,617 | A | 2/1996 | Yamada |
| 5,542,084 | A | 7/1996 | Lowe, Jr. |
| 5,652,909 | A | 7/1997 | Kodosky |
| 5,697,788 | A | 12/1997 | Ohta |
| 5,717,947 | A | 2/1998 | Gallup et al. |
| 5,719,998 | A | 2/1998 | Ku et al. |
| 5,734,863 | A | 3/1998 | Kodosky et al. |
| 5,742,821 | A | 4/1998 | Prasanna |
| 5,764,787 | A | 6/1998 | Nickerson |
| 5,790,877 | A | 8/1998 | Nishiyama et al. |
| 5,805,614 | A | 9/1998 | Norris |
| 5,821,934 | A | 10/1998 | Kodosky et al. |
| 5,826,080 | A | 10/1998 | Dworzecki |
| 5,852,729 | A | 12/1998 | Limberis et al. |
| 5,881,257 | A | 3/1999 | Glass et al. |
| 5,881,263 | A | 3/1999 | York et al. |
| 5,887,183 | A | 3/1999 | Agarwal et al. |
| 5,893,143 | A | 4/1999 | Tanaka et al. |
| 5,936,953 | A | 8/1999 | Simmons |
| 5,966,528 | A | 10/1999 | Wilkinson et al. |
| 5,969,975 | A | 10/1999 | Glass et al. |
| 5,999,736 | A | 12/1999 | Gupta et al. |
| 6,052,766 | A | 4/2000 | Betker et al. |
| 6,064,819 | A | 5/2000 | Franssen et al. |
| 6,104,962 | A | 8/2000 | Sastry |
| 6,112,023 | A | 8/2000 | Dave et al. |
| 6,128,775 | A | 10/2000 | Chow et al. |
| 6,173,389 | B1 | 1/2001 | Pechanek et al. |
| 6,192,384 | B1 | 2/2001 | Daily et al. |
| 6,202,130 | B1 | 3/2001 | Scales et al. |
| 6,253,372 | B1 | 6/2001 | Komatsu et al. |
| 6,370,560 | B1 | 4/2002 | Robertazzi et al. |
| 6,381,687 | B2 | 4/2002 | Sandstrom et al. |
| 6,430,671 | B1 | 8/2002 | Smith |
| 6,437,804 | B1 | 8/2002 | Ibe et al. |
| 6,442,701 | B1 | 8/2002 | Hurd |
| 6,490,612 | B1 | 12/2002 | Jones et al. |
| 6,513,107 | B1 | 1/2003 | Ansari |
| 6,571,016 | B1 | 5/2003 | Mehrotra et al. |
| 6,588,009 | B1 | 7/2003 | Guffens et al. |
| 6,598,221 | B1 | 7/2003 | Pegatoquet et al. |
| 6,629,123 | B1 | 9/2003 | Hunt |
| 6,647,546 | B1 | 11/2003 | Hinker et al. |
| 6,665,749 | B1 | 12/2003 | Ansari |
| 6,732,354 | B2 | 5/2004 | Ebeling et al. |
| 6,745,160 | B1 | 6/2004 | Ashar et al. |
| 6,792,445 | B1 | 9/2004 | Jones et al. |
| 6,795,908 | B1 | 9/2004 | Lee et al. |
| 6,898,691 | B2 | 5/2005 | Blomgren et al. |
| 7,000,232 | B2 | 2/2006 | Jones et al. |
| 7,010,788 | B1 | 3/2006 | Rehg et al. |
| 2002/0080795 | A1 | 6/2002 | Van Wageningen et al. |
| 2002/0112228 | A1 | 8/2002 | Granston et al. |
| 2002/0120923 | A1 | 8/2002 | Granston et al. |
| 2002/1002228 | | 8/2002 | Granston et al. |
| 2003/0128712 | A1 | 7/2003 | Moriwaki et al. |
| 2004/0003206 | A1 | 1/2004 | May et al. |
| 2004/0117595 | A1 | 6/2004 | Norris |
| 2005/0053012 | A1 | 3/2005 | Moyer |
| 2005/0055534 | A1 | 3/2005 | Moyer |
| 2005/0055543 | A1 | 3/2005 | Moyer |

OTHER PUBLICATIONS

Lam, M., Software Pipelining: An Effective Scheduling Technique for VLIW Machines, Proceedings of the SIGPLAN '88 Conference on Programming Language Design and Implementation, Atlanta, Georgia, Jun. 22-24, 1988, pp. 318-328.

Lee, T. et al., A Transformation-Based Method for Loop Folding, IEEE Transactions on Computer-Aided Design of Integrated Circuits and Systems, vol. 13, No. 4, Apr. 1994, pp. 439-450.

Kavi, K.M. et al., A Formal Definition of Data Flow Graph Models, IEEE Transactions on Computers, vol. C-35, No. 11, Nov. 1986, pp. 940-948.

Cooper, K.D. et al., Efficient Computation of Flow Insensitive Interprocedural Summary Information, SIGPLAN Notices, vol. 19, No. 6, Jun. 1984, pp. 247-258.

Strong, H.R., Vector Execution of Flow Graphs, Journal of the Association for Computing Machinery, vol. 39, No. 1, Jan. 1983, pp. 186-196.

Aiken, A. et al., Resource-Constrained Software Pipelining, IEEE Transactions on Parallel and Distributed Systems, vol. 6, No. 12, Dec. 1995, pp. 1248-1270.

Wulf, William A. "Evaluation of the WM Architecture." Proceedings of the 19th Annual International Symposium on Computer Architecture: 1992, pp. 382-390, ACM 0-89791-509-7/92/0005/0382.

Talla, D., Architectural techniques to Accelerate Multimedia Applications on General-Purpose Processors, Dissertation, Aug. 2001, pp. 94-125.

Talla, D., Bottlenecks in Multimedia Processing with SIMD Style Extensions and Architectural Enhancements, IEEE Transactions of Computers, Aug. 2003, pp. 1015-1031, vol. 62, No. 8, IEEE.

Al-Mouhamed, M., "Lower Bound on the Number of Processors and Time for Scheduling Precedence Graphs with Communication Costs", IEEE, Dec. 1990.

Samadzadeh, F. et al., "A Heuristic Multiprocessor Scheduling Algorithm for Creating Near-Optimal Schedules Using Task System Graphs", ACM, 1992.

Prasanna, G.N., et al., "Generalized Multiprocessor Scheduling for Directed Acylic Graphs", IEEE, 1994.

Kwok, Y. et al., "Static Scheduling Algorithms for Allocating Directed Task Graphs to Multiprocessors", ACM, Dec. 1999.

* cited by examiner

FUNCTIONAL UNITS

| TIME STEP | SRC | FU 1 | FU 2 | FU 3 | SINK | |
|---|---|---|---|---|---|---|
| 0 | A1 |  |  | * | * | ⎫ |
| 1 |  | A2 | * |  |  |  |
| 2 |  | * | A3 |  |  | PROLOG |
| 3 | B1 |  |  | A4 | * |  |
| 4 |  | B2 | A5 |  |  |  |
| 5 |  | A6 | B3 |  |  | ⎭ |
| 6 | C1 |  |  | B4 | A7 | ⎫ |
| 7 |  | C2 | B5 |  |  | LOOP BODY |
| 8 |  | B6 | C3 |  |  | ⎭ |
| 9 | * |  |  | C4 | B7 | ⎫ |
| 10 |  | * | C5 |  |  |  |
| 11 |  | C6 | * |  |  |  |
| 12 | * |  |  | * | C7 | EPILOG |
| 13 |  | * | * |  |  |  |
| 14 |  | * | * |  |  | ⎭ |

FIG. 1

| | | | | | | |
|---|---|---|---|---|---|---|
| VLIW 1 | C1 |  |  | B4 | A7 | ⎫ |
| VLIW 2 |  | C2 | B5 |  |  | LOOP BODY |
| VLIW 3 |  | B6 | C3 |  |  | ⎭ |

FIG. 2

METHOD AND APPARATUS FOR ELIMINATION OF PROLOG AND EPILOG INSTRUCTIONS IN A VECTOR PROCESSOR USING DATA VALIDITY TAGS AND SINK COUNTERS

CROSS REFERENCE TO RELATED APPLICATIONS

This application is continuation-in-part of related application Ser. No. 10/184,772 titled "Scheduler for Streaming Vector Processor", filed Jun. 28, 2002 now U.S. Pat. No. 7,140,019 and application Ser. No. 10/184,583 titled "Reconfigurable Streaming Vector Processor", filed Jun. 28, 2002 now U.S. Pat. No. 7,159,099.

FIELD OF THE INVENTION

This invention relates generally to the field of Vector Processors. More particularly, certain embodiments consistent with this invention relate to a method and apparatus for eliminating prolog and epilog programming instructions in a vector processor.

BACKGROUND OF THE INVENTION

Software pipelining for programmable, very long instruction word (VLIW) computers is a technique for introducing parallelism into machine computation of software loops. If different parts of the software loop use different hardware resources, the computation of one iteration of the loop may be started before the prior iteration has finished, thus reducing the total computation time. In this way several iterations of the loop may be in progress at any one time. In machines controlled by VLIW instructions, the instructions in the middle of the loop (where the pipeline is full) are different from the instructions at the start of the loop (the prolog) and the instructions at the end of the loop (the epilog). If computation requires a number of different loops, a relatively large amount of memory is required to store instructions for the epilog and prolog portions of the loops.

Software pipelining for programmable VLIW machines, such as the IA-64, is accomplished by predicating instructions and executing them conditionally as the software pipeline fills and drains. The predication mechanism tags instructions with a predicate that conditions execution and committing of results to the register file in a general-purpose processor. This approach is generalized in these processors because the prediction mechanism is also used for general conditional execution. A disadvantage of this technique is the requirement for a centralized predicate register file.

OVERVIEW OF CERTAIN EMBODIMENTS OF THE INVENTION

Certain embodiments consistent with the present invention relate generally to a mechanism for eliminating prolog and epilog VLIW instructions in a vector processor without the use of centralized structures. Objects, advantages and features of the invention will become apparent to those of ordinary skill in the art upon consideration of the following detailed description of the invention.

In certain embodiments consistent with the invention, tags are associated with data elements in the pipeline to indicate the validity of the data. These tags are used to eliminate the prolog code, by suppressing the sinking of data tokens that are not tagged as valid. This approach avoids the use of centralized structures. The epilog instructions are eliminated by using sink-specific iteration counts, which again avoids the use of centralized structures.

BRIEF DESCRIPTION OF THE DRAWINGS

The novel features believed characteristic of the invention are set forth in the appended claims. The invention itself, however, together with objects and advantages thereof, will best be understood by reference to the following detailed description of certain illustrative embodiments consistent with the present invention when read in conjunction with the accompanying drawing(s), wherein:

FIG. 1 is an exemplary schedule for a computation.

FIG. 2 is a loop body from the exemplary schedule.

DETAILED DESCRIPTION

Figure 3:
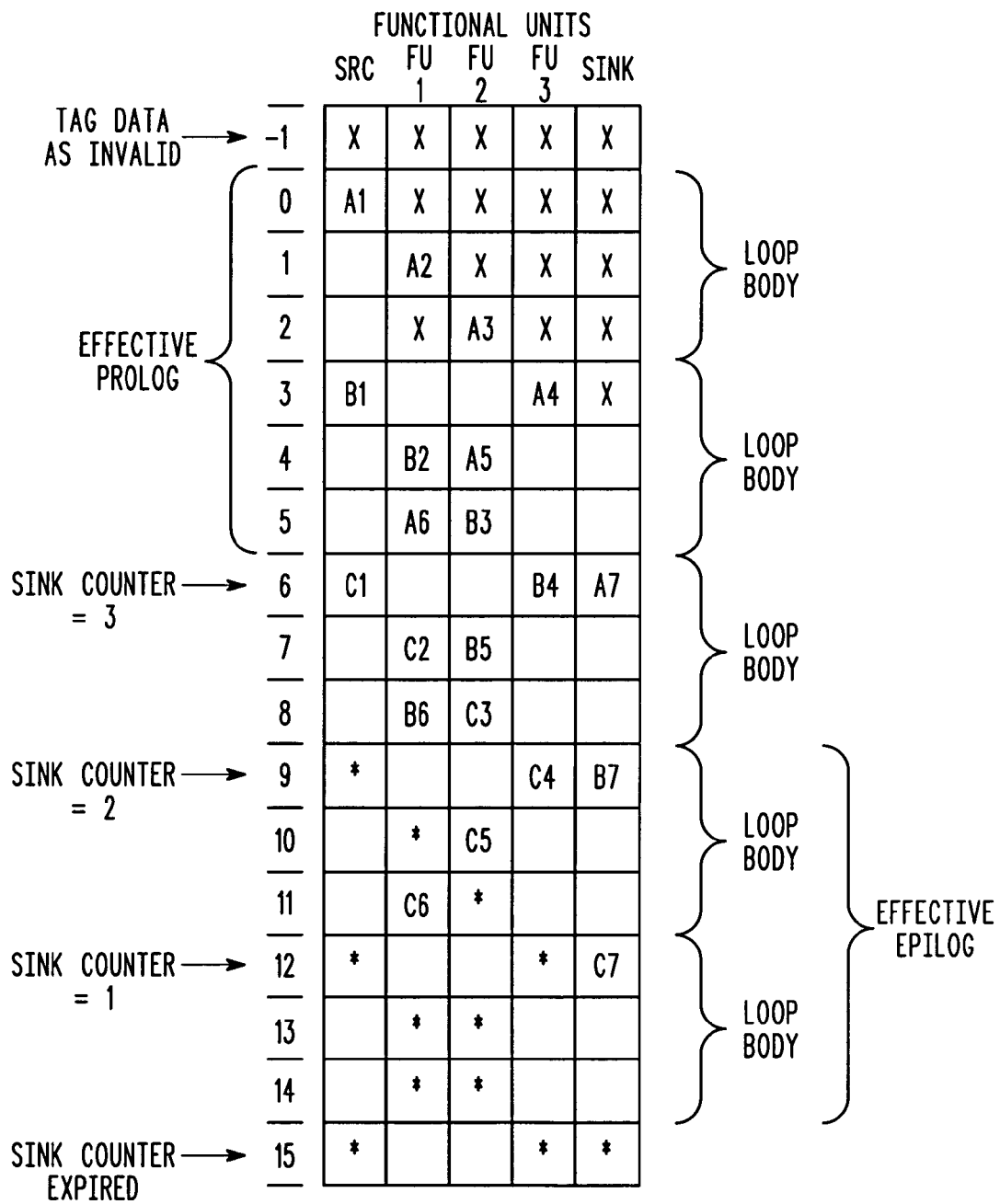
FIG. 3 is an exemplary program schedule illustrating data tags and sink iteration counters of certain embodiments of the present invention.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several Views of the drawings.

The Reconfigurable Streaming Vector Processor (RSVP) is a statically scheduled VLIW machine that executes dataflow graphs on vector data (data streams) in a highly pipelined fashion. The pipelining of calculations for the RSVP and other VLIW vector processors requires a significant amount of storage (memory) for prolog and epilog instructions. One aspect of the present invention is the elimination of the need to store prolog and epilog instructions by the use of two independent mechanisms: data tagging for prolog instruction elimination and sink-specific iteration counters for epilog instruction elimination.

The RSVP architecture provides resources for deeply pipelining computations, limited only by the true data dependencies and the resource limitations of the hardware. These deep computational pipelines would require many VLIW control words in the general case both for priming the pipeline (prolog) and draining the pipeline (epilog). In one example, the memory requirement for an MPEG4 encoder was reduced by 74% by eliminating prolog and epilog VLIW control words.

"In general, a loop comprises a prolog, a loop-body and an epilog. The prolog and epilog instructions are generally a subset of the instructions in the body of the loop. The prolog instructions are placed at the start of the loop, before the loop body and are used for priming the pipeline. The epilog instructions are placed at the end of the loop, after the loop body and are used for draining the pipeline. According to the present invention, mechanisms are provided to guard the execution (committing of results) to the correct subset of the loop-body. Consequently, the data path can repeatedly execute the loop-body, thereby eliminating the prolog and epilog code."

By way of example, a simple RSVP routine for performing a quantization operation will be described. The routine is coded in linearized flow form as:

|    | vbegin    | 7f-1f, 0 |
|----|-----------|----------|
| 1: | vld.s16   | v1       |
| 2: | vsign.s16 | 1b       |
| 3: | vmul.s16  | 2b, s2   |
| 4: | vsub.s16  | 1b, 3b   |
| 5: | vmul.s32  | 4b, s1   |
| 6: | vasru.s16 | 5b, 16   |
| 7: | vst.s16   | 6b, v0   |
|    | vend      |          |

This exemplary linearized flow form uses the functional operations:

vld.s16—load an element from a vector of 16-bit values vsign.s16—calculate the sign of an element from a vector of 16-bit values vmul.s16—multiply two 16-bit vector elements vmul.s32—multiply two 32-bit vector elements vsub.s16—subtract two 16-bit vector elements vasru.s16—arithmetic shift right a 16-bit vector element vst.s16—store a 16-bit result vector element.

FIG. 1 shows how three iterations of the quantization loop can be scheduled. Referring to FIG. 1, each row denotes a time step and each column denotes a hardware functional unit (FU) or hardware resource of the vector processor. SRC denotes a data source or input and SINK denotes a data store or output. In this example, FU 1 is a logic device, FU 2 is a multiplier and FU 3 is an adder. At each time step a VLIW specifies the activity of each functional unit in addition to the location of the data used in the activity. The prefixed letters denote the iteration. For example, B3 is the third node of iteration B. In this example up to three iterations are being processed at one time (in time step 6 for example). The process is pipelined so that a new result is obtained every 3 cycles, whereas a single iteration requires 7 cycles. At the start and end of the computation, the pipeline is not filled, and the asterisks denote invalid data. In prior processors, the sequences of instructions involving invalid data are coded separately and are referred to as the prolog and the epilog. FIG. 1 shows only three iterations of the loop. When multiple iterations are required, three instructions in the loop body are repeated, but the epilog and prologs are unchanged. The loop body is shown in FIG. 2. The loop body comprises three VLIW instructions. In this example, the prolog and epilog have 6 instructions each, while the loop body is only 3 instructions. Thus, the memory required to store the instructions for this computation is reduced significantly if the prolog and epilog are eliminated.

FIG. 3 illustrates one embodiment of the present invention. In accordance with a first aspect of the invention, data tokens in the functional units include both a data value and a data validity tag, or "valid bit". In a valid state, the data validity tag indicates that the data value is either the result of a valid token source's output, or the result of a calculation performed on all valid inputs. If this is the case, the token may be committed to memory (sunk). Otherwise, if neither condition is met, the data validity tag is in an invalid state and the data token is ignored at the sink, and is not committed to memory. Here, the term memory is taken to include any kind of data store, such as a memory cell or a register. The operation of the processor may be described by a dataflow graph and coded in linearized flow form. When execution of a graph is initiated, the intermediate result registers in the data path are all set to "invalid" so that only data from sources in the current execution of the graph will be committed. In addition, the data validity tags may be used to disable computations, thus saving energy. Referring to FIG. 3, the initialization is indicated by time step −1. The X's denote that data token in the corresponding functional unit or source unit is tagged as invalid. At subsequent time steps, the data tokens are replaced by valid tokens. At time step 0 input data is read and the SRC will contain a valid data token. At time step 2, this data token is passed to FU 1 and the operation A2 results in a valid data token. This process continues until the effective prolog is completed: In this manner, the VLIW instructions from the loop body may be used without alteration during the prolog, and the prolog instructions are eliminated. The data tokens propagate through the graph just as they do in the loop body, but the hardware recognizes when the data is invalid and tags the resulting output as invalid.

A second aspect of the present invention is the elimination of the epilog instructions. In one embodiment of this aspect, illustrated in FIG. 3, each token sink has its own copy of the iteration count for the currently executing graph. These iteration counts are decremented under VLIW control, and each sink is aware of its current iteration count. Individual iteration counts may differ due the deeply pipelined nature of the RSVP. This allows each sink to determine precisely when it needs to stop without referring to any centralized source. In the example shown in FIG. 3, a single sink is used. The sink iteration counter is initialized to three and is decremented at time steps 6, 9 and 12. At time step 3 the data is still tagged as invalid so the data is not sunk and the counter is not decremented. At time step 12 the last data token is sunk and the counter is decremented from 1 to 0. At time step 15 (and any subsequent time steps) the sink iteration counter has expired and the data token is again not sunk. If FU 1 were a sink, its sink counter would be decrement to zero at time step 11. Of course, counters may be incremented to a specified value rather than decremented, or may be decrement to a specified value other than zero. In this manner, the loop body code may be repeated for the epilog, and the epilog instructions are eliminated.

In addition, the input vector stream sources (input VSUs) may have private iteration counts to maintain the correct architectural state at graph completion (so that, architecturally, input addresses are left pointing to the next valid element in the array upon graph completion).

Figure 4:
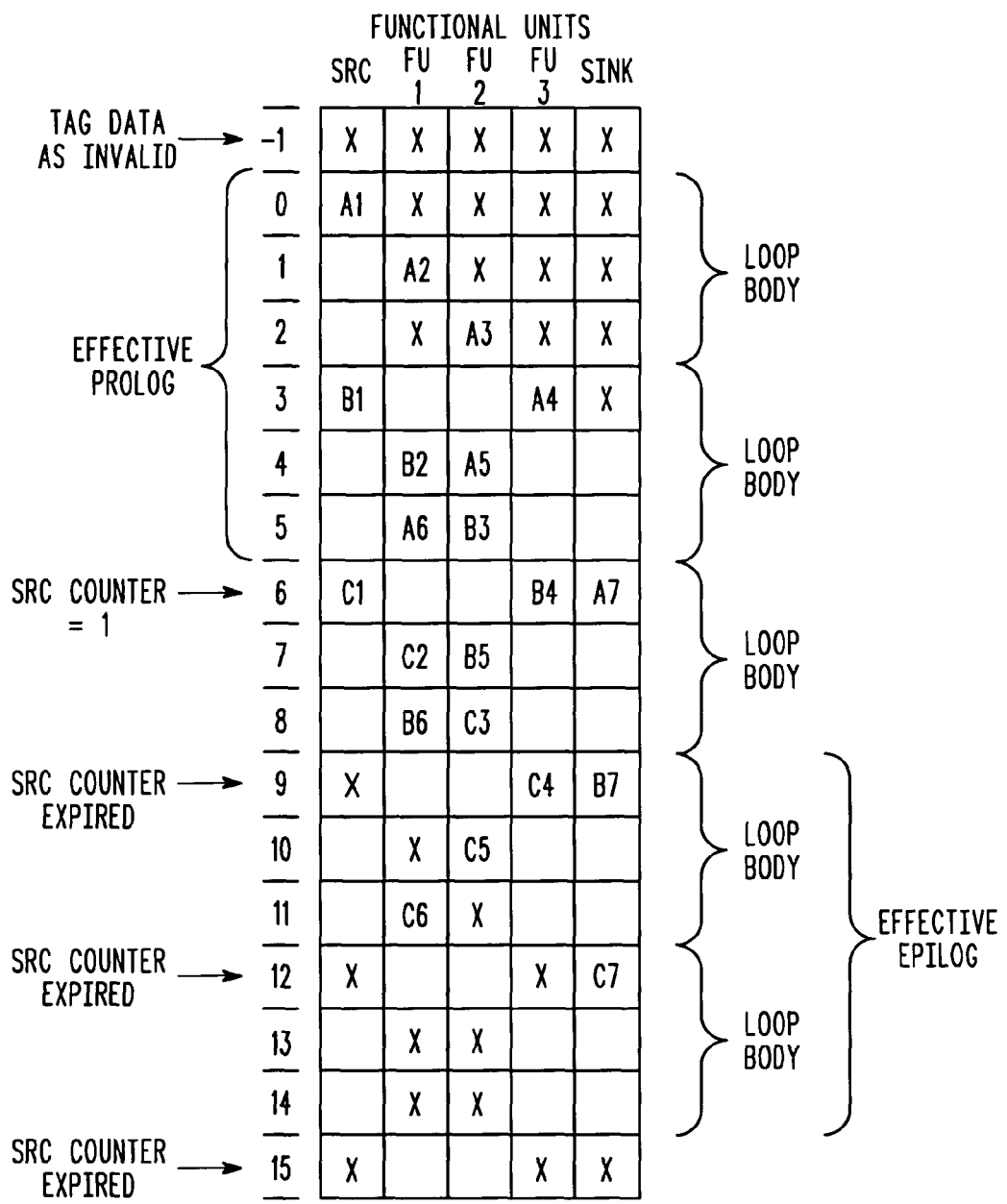
FIG. 4 is an exemplary program schedule illustrating data tags and source iteration counters of certain embodiments of the present invention.

In a further embodiment of the present invention, source iteration counters are used for inputs to eliminate epilog instructions. This approach is illustrated in FIG. 4. Referring to the example shown in FIG. 4, which uses a single source, a source counter is initialized to 3 and is decremented at time steps 0, 3 and 6. At time step 9, the counter has expired, so the data token is marked as invalid (as indicated by the "X"). When the invalid data propagates through to the sink at time step 15, the tag is checked and the token is not sunk. In this approach, other data sources (including constant values stored in registers) may require counters.

Figure 5:
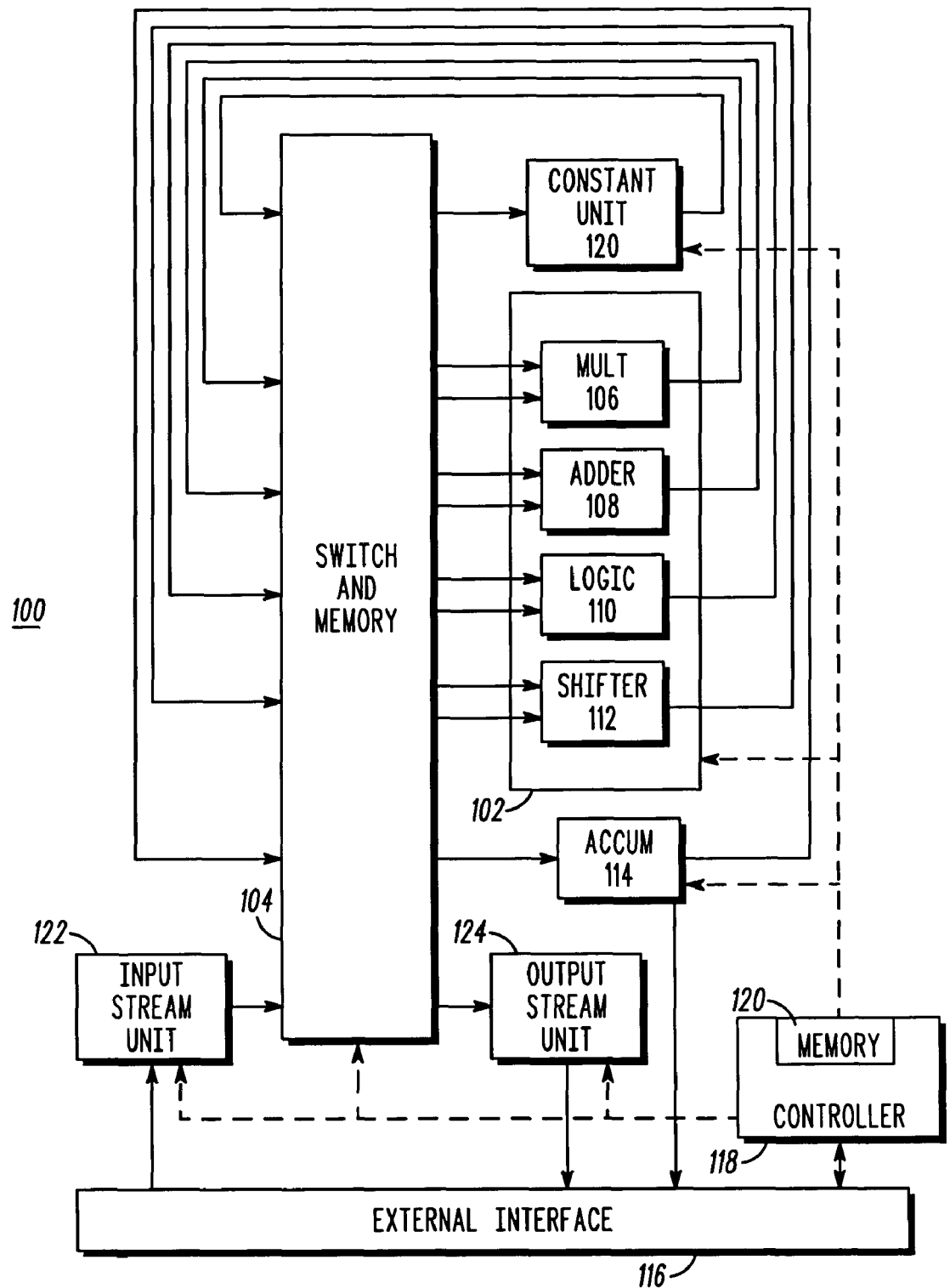
FIG. 5 is a diagrammatic representation of an embodiment of a re-configurable streaming vector processor.

An exemplary embodiment of RVSP hardware 100 is shown in FIG. 5. Referring to FIG. 5, the outputs and inputs of a number of functional units 102 are interconnected via a re-configurable interconnection switch 104. The functional units may include a multiplier 106, an adder 108, a logic unit 110 and a shifter 112. Other functional units may be included, and multiple functional units of a particular type may be included. The outputs from the functional units may be single registers or pipeline registers. The registers allow for storage of data tokens and the associated data validity tags. The functional units may support bit-slice operations. For example, the multiplier may have a 128-bit input and a 128-bit output and be able to perform two 32×32 to 64 or four 16×16 to 32-bit multiplies. In this case, a data validity tag is associated with each data value. The hardware also includes one or more accumulators 114. In the preferred embodiment, the accumulators act as both accumulators and storage registers, and are interfaced both to the interconnection switch 104 and to an external interface 116. The accumulators operate as data sinks and as functional elements. The external interface 116 enables the RSVP to link with a host processor and allows the host processor to access the accumulators and other parts of the RSVP. The functional units 102 and the re-configurable interconnection switch 104 define the data-path for the RSVP. The functional units and the re-configurable interconnection switch 104 are linked to a controller 118 that includes a memory 120, preferably a cache, for storing a program of instructions describing the implementation specific description of a data-flow graph of the desired vector computation. At each cycle of the processor clock, the controller produces control words that configure the links in the interconnection switch and drive the function units. Storage and presentation of scalar values and tunnel node functionality is provided by constant unit portion of memory 120. The scalar values and tunnel initialization values may be loaded by the host processor or by the program of instructions. In operation, input data values are provided to the interconnection switch 104 by one or more input-stream units 122 (only one unit is shown the figure). Each input-stream unit 122 is controlled by a set of parameters describing the allocation of data in an external memory. This set of parameters is provided by the host processor, to which the input-stream unit is connected via external interface 116. The output-stream unit 124 is similarly controlled by the host processor and is operable to transfer data from the re-configurable interconnection switch 104 to external memory. The input-stream unit 122 and the output-stream unit 124 are linked to the controller 118 that synchronizes data flow.

Figure 6:
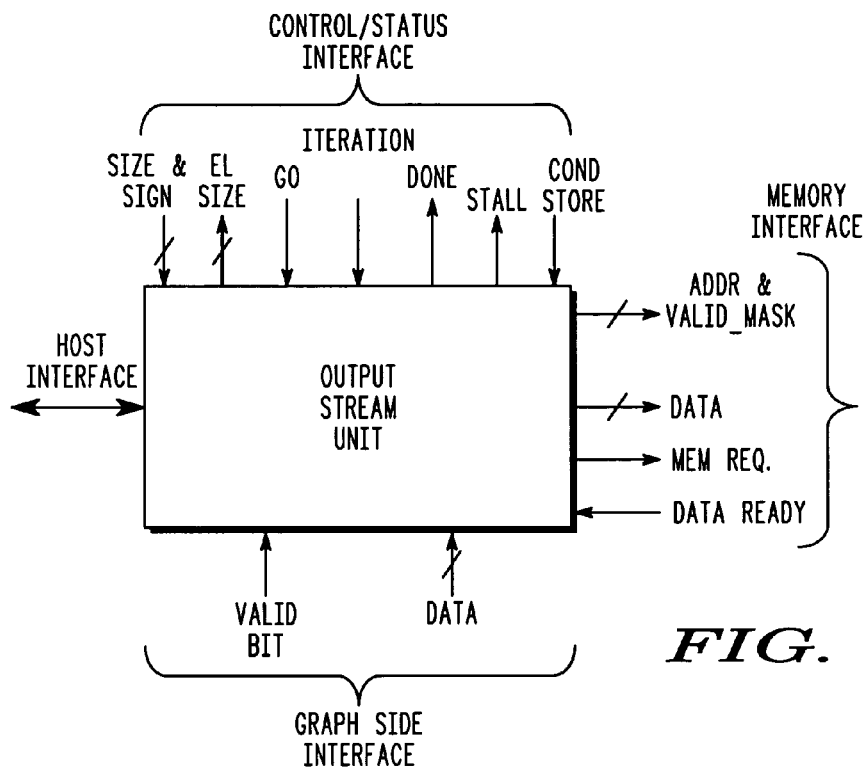
FIG. 6 is an embodiment of an output stream unit of the present invention.

An example of an output stream unit is shown in FIG. 6. Referring to FIG. 6, the output steam unit has a host interface, a memory interface, a control/status interface and a graph-side interface. In operation, the output stream unit is controlled by the control/status interface that is linked to the program controller. The "DONE" indicator signals that the output stream unit has produced its last valid token. The DONE indicator may be asserted when the sink iteration counter of the output stream unit has expired. When all output stream units have signaled that they are finished, the controller knows that the computation has been completed. A "STALL" indicator is asserted if the output stream unit is not ready, as for example when the memory bandwidth is insufficient and the previous data from the graph side interface has not yet been written to memory. The graph-side interface receives data from functional units in the vector processor. In addition to the DATA itself, a data validity tag denoted by the signal VALID BIT is received which indicates if the data is valid. The VALID BIT signal is a digital signal representing one or more data validity tags. The VALID BIT signal is in an asserted state when the data is valid. In a further embodiment, the data comprises a number of sub-words, e.g. four 16-bit data values contained within a 64-bit data word. In this embodiment, four data validity tags (valid bits) are received, one for each sub-word. In the preferred embodiment, the logic for processing the sink iteration counter and for processing the data validity tags is implemented in hardware and an individual counter is associated with each output stream unit or other sink (such as an accumulator). Thus, the mechanism for epilog elimination is distributed.

Figure 7:
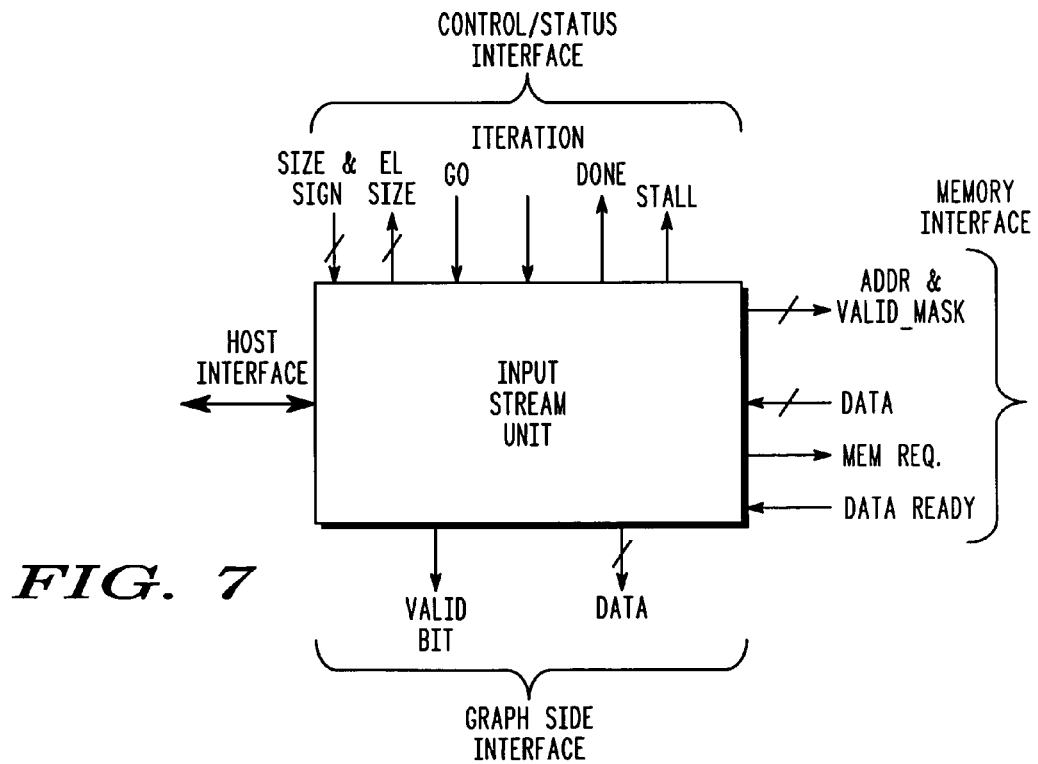
FIG. 7 is an embodiment of an input stream unit of the present invention.

An example of an input stream unit is shown in FIG. 7. Referring to FIG. 7, the input steam unit has a host interface, a memory interface, a control/status interface and graph-side interface. In operation, the input stream unit is controlled by the control/status interface that is linked to the program controller. The "DONE" indicator signals that the input stream unit has produced its last valid token. The DONE indicator may be asserted when the input device has read a specified number of input tokens. A "STALL" indicator is asserted if the data from an external memory is not ready, as for example when the memory bandwidth is insufficient. The graph-side interface provides data to be passed to functional units in the vector processor. In addition to the DATA itself, a data validity tag, denoted by VALID BIT, is passed to the unit. The data validity tag is set if the data is valid. In a further embodiment, the data comprises a number of sub-words, e.g. four 16-bit data values contained within a 64-bit data word. In this embodiment, four data validity tags are used, one for each sub-word.

Figure 8:
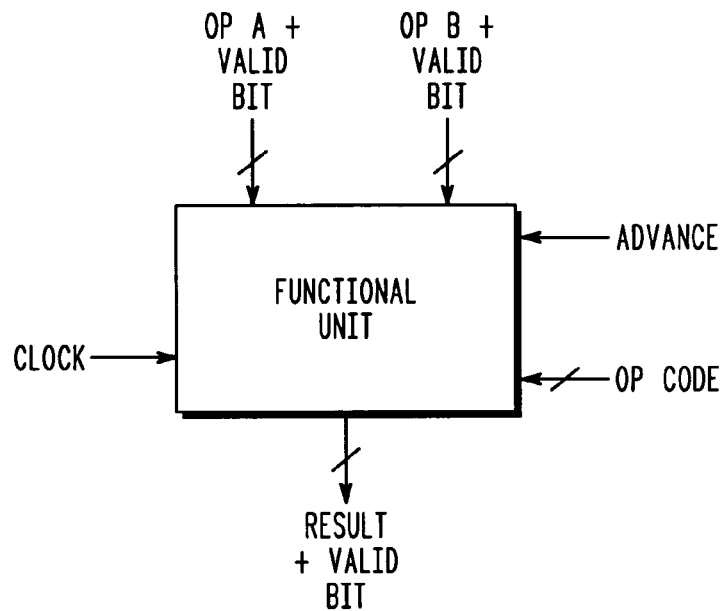
FIG. 8 is an embodiment of a functional unit of the present invention.

FIG. 8 is a diagrammatic representation of an exemplary functional unit of the present invention. Referring to FIG. 8, the functional unit receives one or more input operands (data tokens), indicated as OP A and OP B in the figure. Associated with input operand is a data validity tag that indicates whether the data token is valid. Data tokens may be invalid, for example, if they were produced as a result of operations on other invalid data tokens. The data may comprise a number of sub-words, e.g. four 16-bit data values contained within a 64-bit data word, in which case four VALID BITs are used, one for each sub-word. The functional units are controlled by CLOCK and ADVANCE signals and by instructions (OP CODES) derived from the VLIW instructions processed by the controller. The result of the operation performed in the functional unit is output, together with a corresponding number of VALID BITs. The logic for determining the output data validity tags from the input data validity tags is preferably implemented as hardware in the functional unit, so that no centralized resources are required.

Figure 9:
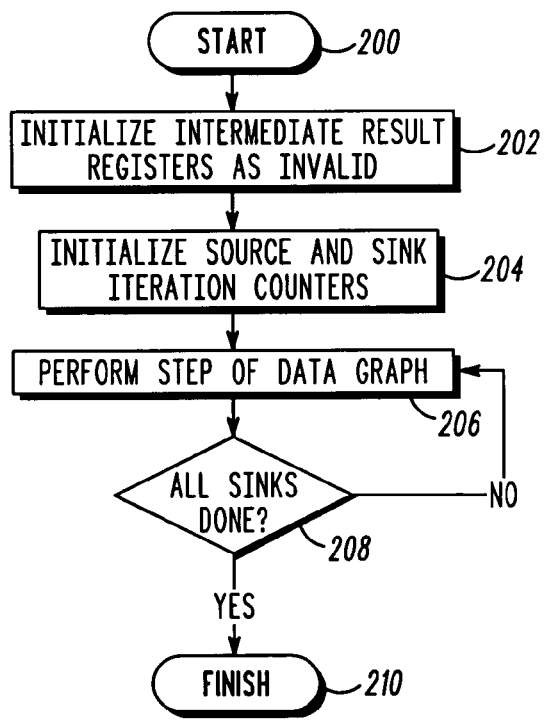
FIG. 9 is flow chart illustrating an embodiment of a method of the invention.

One embodiment of the method of present invention is illustrated in the flow chart in FIG. 9. The flow chart illustrates a method of processing a single pipelined computation in a streaming vector processor. Following start block 200, all of the intermediate storage registers of the processor (e.g. the output registers of functional units) are initialized at block 202 so that the valid bit (data validity tag) of each register indicates that the data value is invalid. The data value need not be initialized, since the valid bit will ensure that it is not used in the subsequent calculation of a result. At block 204, the source and sink iteration counters are initialized. Typically, the initial values are equal to the loop count. At block 206 a step of the data graph (the program of instructions) is performed. This step is described in more detail below with reference to FIGS. 10, 11 and 12. At decision block 208, a check is made to determine if all of the data sinks have finished storing data values. As described below with reference to FIG. 11, each data sink indicates to the controller when is has finished storing results. If all the sinks are not yet finished, as indicated by the negative branch from decision block 208, flow returns to block 206. If all the sinks are done, as indicated by the positive branch from decision block 208, the computation is complete and terminates at block 210.

Figure 10:
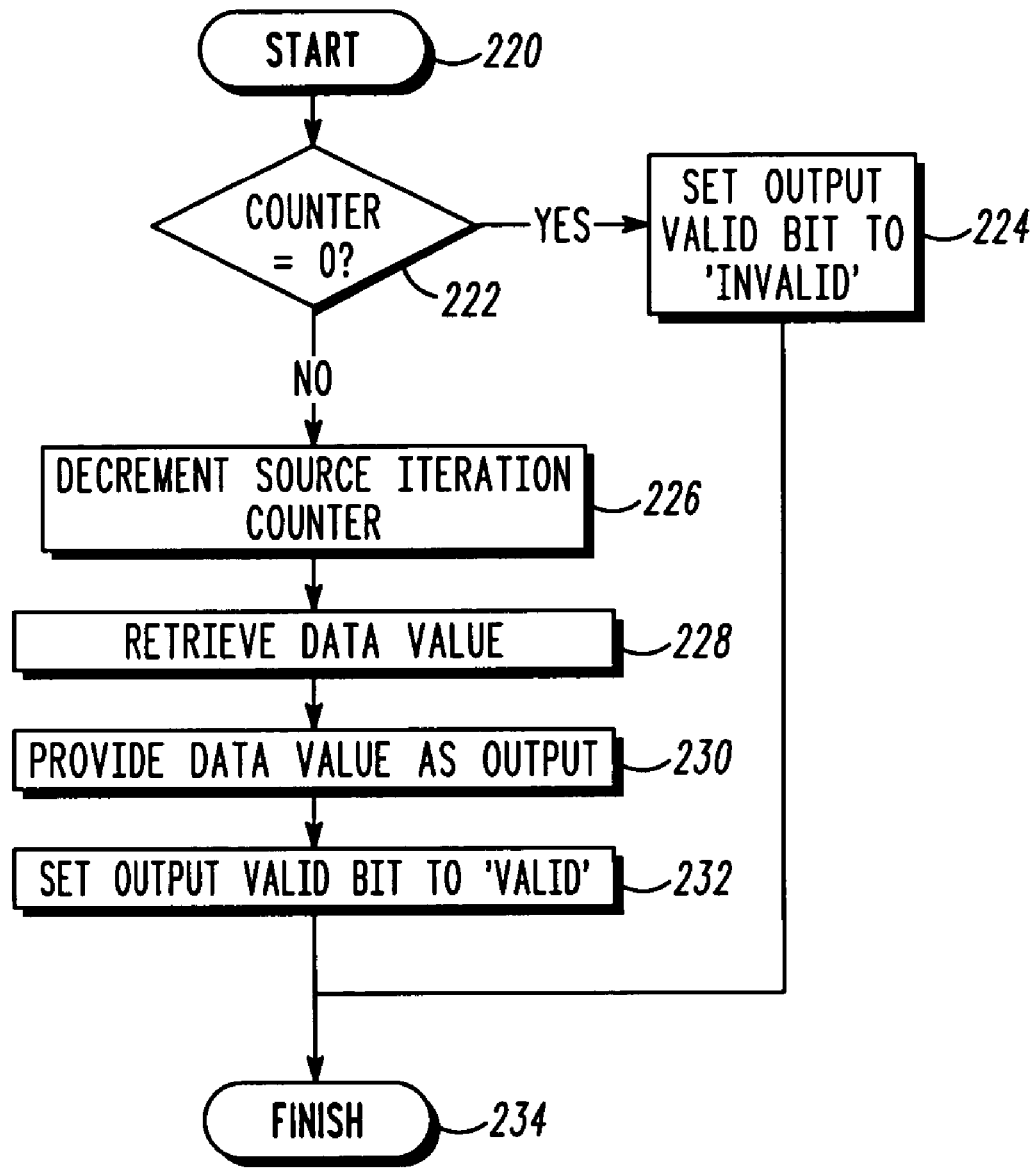
FIG. 10 is flow chart illustrating the operation of a data source element in accordance with certain embodiments of the invention.

The flow chart in FIG. 10 illustrates the method of operation of a source unit for a single program step in a pipelined computation. Following start block 220, a check is made, at decision block 222, to determine if the source iteration counter is equal to zero (expired). If the source iteration counter is expired, as indicated by the positive branch from decision block 222, flow continues to block 224, where the data validity tag associated with the output from the unit is set to indicate that the data is invalid. If the counter has not expired, as indicated by the negative branch from decision block 222, the source iteration counter is decremented at block 226. Each source unit has a counter associated with it. A data value is retrieved from memory at block 228 and, at block 230, the data value is provided as an output. At block 232 the data validity tag associated with the data value is set to indicate that the value is valid and may be used in subsequent computations. The process terminates at block 234. Thus, the output data value is tagged with a data validity tag, which indicates the validity of the data value.

Figure 11:
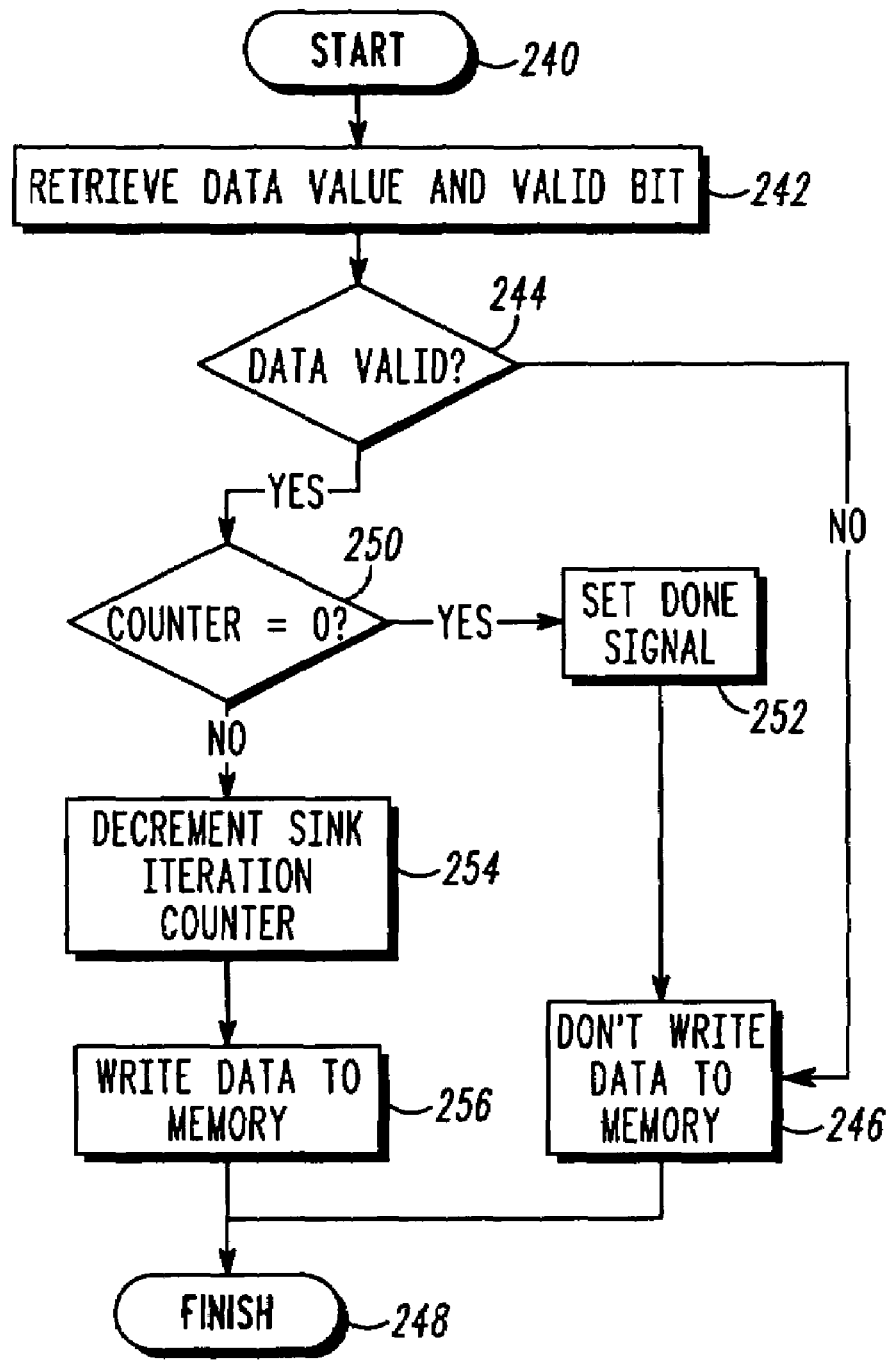
FIG. 11 is flow chart illustrating the operation of a data sink element in accordance with certain embodiments of the invention.

The flow chart in FIG. 11 illustrates the method of operation of a sink unit for a single program step in a pipelined computation. Following start block 240, the incoming data value and the associated data validity tag are retrieved at block 242. At decision block 244 the validity of the data value is checked by examining the data validity tag. If the data is invalid, as indicated by the negative branch from decision block 244, the data value is not sunk to memory (block 246) and operation terminates at block 248. If the data is valid, as indicated by the positive branch from decision block 244, a check is made at decision block 250 to see if the sink iteration counter has expired. If it has expired, as indicated by the positive branch from decision block 250, a DONE signal is sent to the controller at block 252 to indicate that this source unit has completed its task for the current program loop. If the sink counter has not expired, as indicated by the negative branch from decision block 250, the sink iteration counter associated with this sink unit is decremented at block 254 and the data value is committed to memory at block 256. The process terminates at block 248.

It will be apparent to those of ordinary skill in the art that counters, such as the source iteration counter and the sink iteration counter, may be incremented or decremented. The term 'adjusting' will be used in the sequel to mean either incrementing or decrementing. In addition, the counters need not be initialized. Instead, the starting value may be noted and the difference between the starting value and current value used to determine if the counter has expired. Hence, counter initialization is taken to mean setting the counter to a specified value or noting the current value of the counter.

Figure 12:
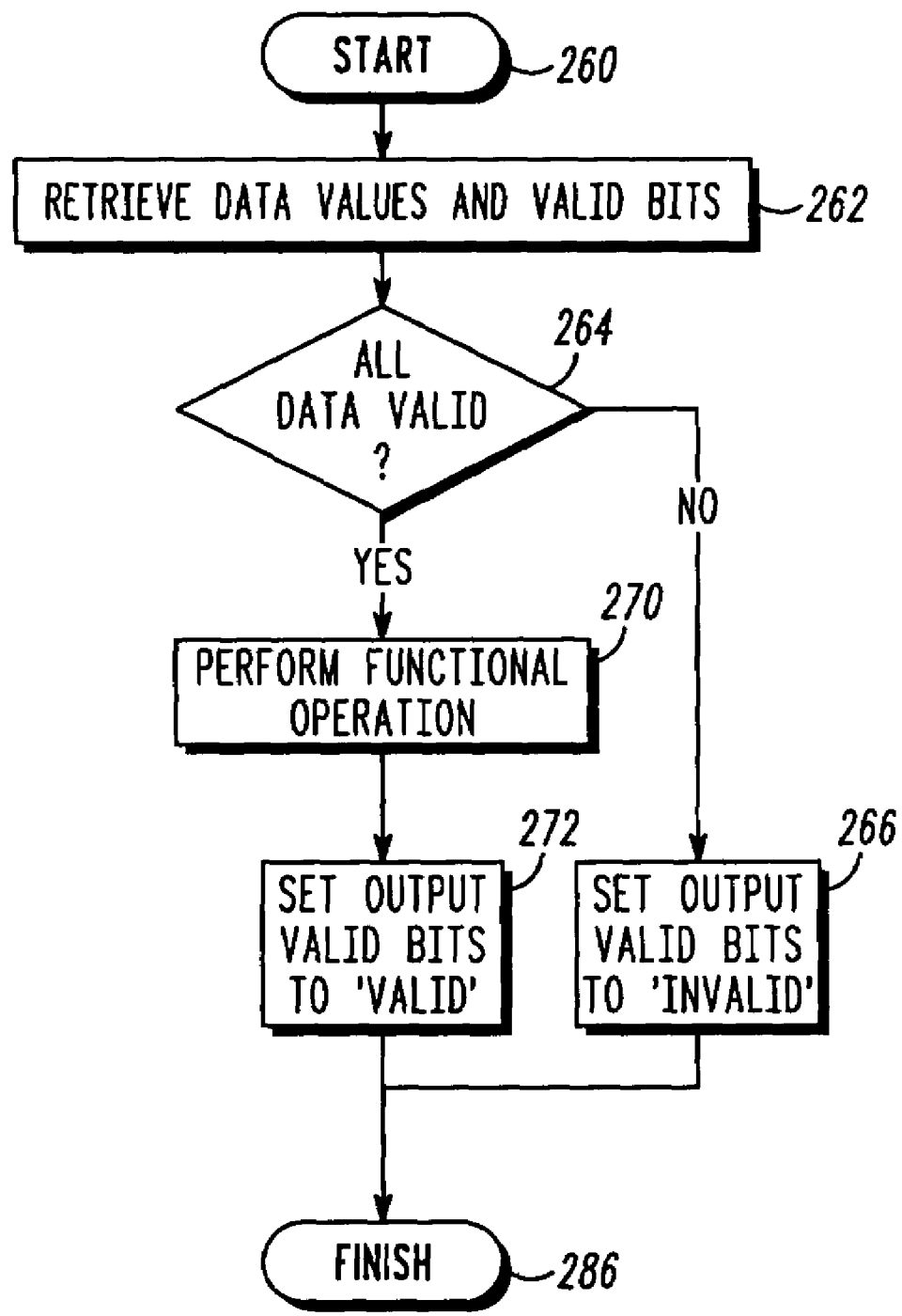
FIG. 12 is flow chart illustrating the operation of a functional element in accordance with certain embodiments of the invention.

The flow chart in FIG. 12 illustrates the method of operation of a functional (computational) unit of the vector processor. Following start block 260, the data values corresponding to the input operands are retrieved at block 262, together with the associated data validity tag for each data value. At decision block 264, the data validity tags are checked to determine if all data values to be used in the computation are valid. If not, as indicated by the negative branch from decision block 264, the data validity tag(s) associated with the output data value are set to indicate that the output data is invalid. If the input data is valid, as indicated by the positive branch from decision block 264, the functional operation is performed at block 270 and the output data value is calculated. At block 272, the data validity tag associated with the output data value is set to indicate that the data is valid and the process terminates at block 268.

Those of ordinary skill in the art will recognize that the present invention has been described in terms of exemplary embodiments based upon use of RSVP hardware architecture. However, the invention should not be so limited, since the present invention could be implemented using other processors, which are equivalents to the invention as, described and claimed. Similarly, general purpose computers, microprocessor based computers, digital signal processors, microcontrollers, dedicated processors, custom circuits and/or ASICS may be used to construct alternative equivalent embodiments of the present invention. In addition, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Such variations are contemplated and considered equivalent.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method for executing, on a processor, a pipelined program loop having a loop body but no separately coded prolog instructions for priming the pipeline, the processor comprising a plurality of functional units coupled through an interconnection switch and controlled by a controller, each functional unit of the plurality of functional units having at least one input for receiving an input data value and an associated input data validity tag, the method comprising:
   executing the loop body for a plurality of iterations without executing any separately programmed prolog instruction for priming the pipeline; and
   at each iteration of the plurality of iterations:
      determining if the input data values of a functional unit of the plurality of functional units are valid by checking the associated input data validity tags,
      executing the iteration whether or not the input data values are valid, and
      setting an output data validity tag to indicate that a resulting output data from the functional unit is invalid if any of the input data values to the functional unit is invalid.

2. A method in accordance with claim 1, wherein a functional unit of the plurality of functional units includes a result register for storing an intermediate result and an associated output data validity tag, the method further comprising:
   at each iteration of the plurality of iterations:
      if all of the input data values are valid, performing a functional operation on the input data values, storing the result of the functional operation in the result register and setting the associated output data validity tag to indicate that the intermediate result is valid.

3. A method in accordance with claim 2, further comprising initializing an output data validity tag in the result register of each of the plurality of functional units to indicate that the associated intermediate result is invalid.

4. A method in accordance with claim 3, further comprising:
  storing output data values only if the associated output data validity tag indicates that the data is valid.

5. A method in accordance with claim 3, wherein the processor further comprises at least one data source unit, each with an associated source iteration counter, the method further comprising:
  initializing each source iteration counter; and
  at each iteration of the specified number of iterations for which a data value is to be read by a data source unit:
    determining from the source iteration counter associated with the data source unit if all data values have been retrieved from memory;
    if not all data values have been retrieved from memory, adjusting the source iteration counter, retrieving a data value from a data memory and setting the associated data validity tag to indicate that the result is valid; and
    if all data values have been retrieved from memory, setting the output data validity tag to indicate that the result is invalid.

6. A method in accordance with claim 5, further comprising each data source unit signaling the controller when the associated source iteration counter indicates that all data values have been retrieved from memory.

7. A method in accordance with claim 3, wherein the pipelined program loop has no separately coded epilog instructions for draining the pipeline and the processor further comprises at least one data sink, each data sink being associated with a sink iteration counter and operable to receive an output data value and an associated output data validity tag from the interconnection switch, the method further comprising:
  initializing the sink iteration counter of each data sink; and
  at each iteration of the specified number of iterations:
    determining the validity of the output data from the associated output data validity tag;
    if the output data is valid:
      determining from the sink iteration counter if all data values have been committed to memory;
      adjusting the sink iteration counter associated with the data sink unit if not all data values have been committed to memory;
      committing the output data value to memory if not all data values have been committed to memory; and
      signaling the controller if all data values have been committed to memory, and
    if the output data is invalid:
      leaving the sink iteration counter unchanged.

8. A method for executing, on a processor, a pipelined program loop having a loop body but no separately coded epilog instructions for draining the pipeline comprising a plurality of functional units and at least one data sink coupled through an interconnection switch and controlled by a controller, each data sink being associated with a sink iteration counter, the method comprising:
  initializing each sink iteration counter;
  executing the loop body for a specified number of iterations without executing any separately programmed epilog instruction for draining the pipeline; and
  at each iteration of the specified number of iterations for which a data value is to be sunk by a data sink unit:
    determining if the sink iteration counter of the data sink unit indicates that all data values have been committed to memory, and
    executing the iteration without committing the data value to memory if the sink iteration counter indicates that all data values have been committed to memory.

9. A method in accordance with claim 8, further comprising committing the data value to memory if not all data values have been committed to memory.

10. A method in accordance with claim 8, further comprising adjusting the sink iteration counter associated with the data sink unit if not all data values have been committed to memory.

11. A method as in claim 8, further comprising each data sink unit signaling the controller when the associated sink iteration counter indicates that all data values have been committed to memory.

12. A method as in claim 11, further comprising terminating the execution of the pipelined program loop after all data sink units have signaled to the controller that all their data values have been committed to memory.

13. A method for reducing the number of instructions in a program for controlling a computational pipeline of a processor, the method comprising:
  implementing instructions for priming the pipeline as one or more iterations of the loop body;
  associating each data value in the pipeline with a data validity tag;
  initializing data validity tags to indicate that associated data values are invalid; and
  during execution of the loop body:
    setting data validity tags to indicate that an associated data value is valid if it is the result of an operation on all valid data; and
    setting data validity tags to indicate that an associated data value is invalid if it is the result of an operation on any invalid data.

14. A method in accordance with claim 13, further comprising implementing control words for draining the pipeline as one or more iterations of the loop body.

15. A method in accordance with claim 13, further comprising:
  during execution of the loop body:
    setting data validity tags to indicate that an associated data value is invalid if an associated source counter has expired.

16. A method in accordance with claim 13, further comprising:
  during execution of the loop body:
    sinking a data value to a data sink unless an associated data validity tag indicates that the data value is invalid.

17. A method in accordance with claim 13, further comprising:
  during execution of the loop body:
    sinking a data value to a data sink unless an associated sink counter has expired.

* * * * *